(No Model.)
J. L. PERRY.
ABRADING CYLINDER.
No. 346,681. Patented Aug. 3, 1886.
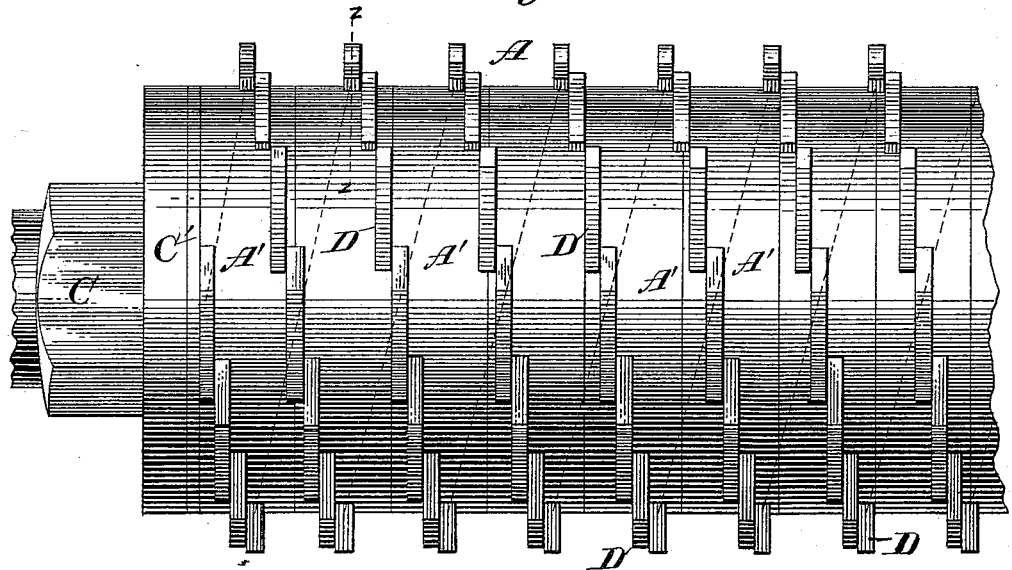
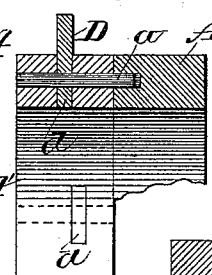
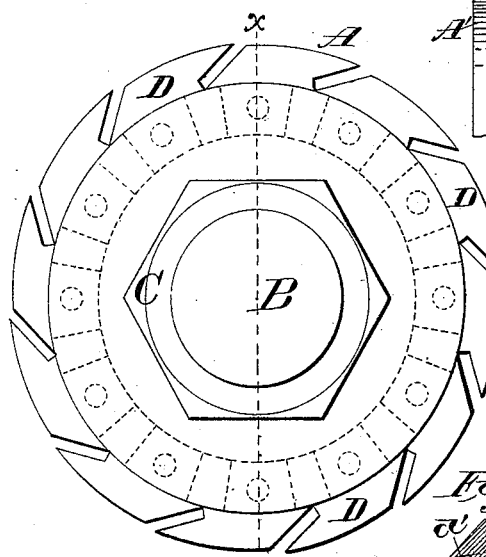
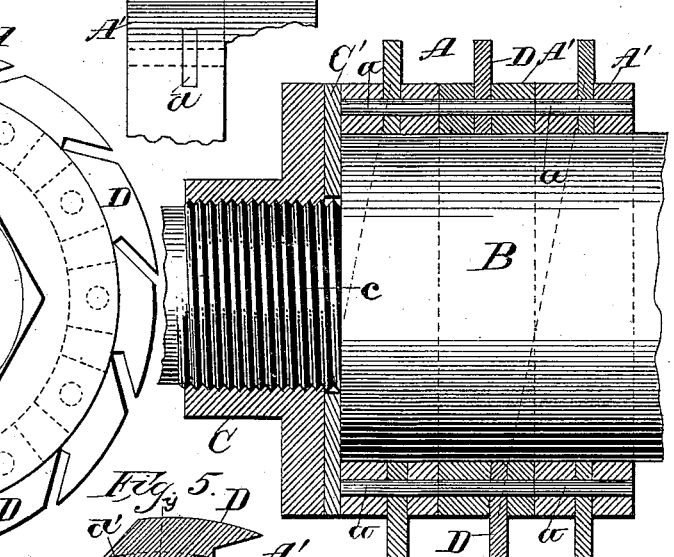
Witnesses:
E. J. Asmus
R. Platz
Inventor:
James L. Perry
By Stout & Underwood
Attorneys.

UNITED STATES PATENT OFFICE.

JAMES L. PERRY, OF WATERTOWN, WISCONSIN.

ABRADING-CYLINDER.

SPECIFICATION forming part of Letters Patent No. 346,681, dated August 3, 1886.

Application filed January 9, 1886. Serial No. 188,069. (No model.)

*To all whom it may concern:*

Be it known that I, JAMES L. PERRY, of Watertown, in the county of Jefferson, and in the State of Wisconsin, have invented certain new and useful Improvements in Abrading-Cylinders; and I do hereby declare that the following is a full, clear, and exact description thereof.

My invention relates to abrading-cylinders, and will be fully described hereinafter.

In the drawings, Figure 1 is an elevation of one of my cylinders, partly broken away at one end. Fig. 2 is an end view of the same. Fig. 3 is a section on line $xx$, Fig. 2. Fig. 4 is a section on line $yy$, Fig. 5. Fig. 5 is a section on line $zz$, Fig. 1.

A is the cylinder proper, which consists of a series of rings, A', which are bound together on a shaft, B, by a nut, C, and washers C'.

D are the abrading-teeth, each of which has a shank, $d$, that is preferably wedge-shaped to fit into a corresponding opening in one of the rings or sections A' of the cylinder or between two of the sections A', according to the position of the tooth. These teeth are shouldered at $d'$, and are arranged in the cylinder so as to break joints with each other, and preferably in a spiral, the spiral being either single or double, according to the requirements of the work to be done by the abrader, and the teeth are held in place by a bolt, $a$, which may extend through one ring or section of the cylinder into another, as shown in Fig. 4; or one bolt may extend through several teeth and sections, as shown in Fig. 3; or two bolts may be used, as shown in dotted lines in Fig. 5, each of which passes through an edge of the bevel portion of the shank of the teeth and through the edge of slot in which the bolt fits. The heel of each tooth slants backward, while its point slants forward and is undercut to permit of its being sharpened, and there is a depressed curve from the point of the tooth back of the heel, which leaves the point higher than the heel. After these teeth have been put in place in and between the sections on the shaft B a washer, C', is placed upon each end of the shaft about its reduced screw-threaded portion $c$, and then the nut C is screwed on until the sections are clamped solidly together, and when any one of these becomes so injured as to render its removal necessary the ends can be loosened and the sections separated to give access to it. The shoulders $d'$ of the teeth prevent them from entering too far into the sections, and keep them at a uniform height.

I am aware that abrading-cylinders have heretofore been built up of rings surrounding a central arbor and held thereon by clamping-nuts screwed upon the ends of such arbor; also, that cutters or teeth have heretofore been arranged spirally upon such cylinders and held removably thereon by notched shanks; hence I do not claim such features, broadly; but,

Having thus fully described my invention, what I claim as new, and desire to secure by Letters Patent, is—

1. An improved abrading-cylinder consisting of an arbor or shaft, and a series of rings or sections secured thereon, and a series of separate cutting-teeth secured removably upon said rings or sections by bolts passing through the teeth and rings, substantially as described, the said teeth forming a continuous spiral upon the cylinder, for the purpose stated.

2. The combination, with the arbor B, having the reduced threaded end $c$, of the rings A', surrounding said arbor and having each a series of sockets arranged in a segment of a spiral, the cutters D in said sockets, the bolts $a$, for holding said cutters, the nut C upon the threaded end $c$, and the washers C', interposed between the nut and contiguous ring A', substantially as described.

3. The combination, with a ring or section, A', having one or more tapered sockets, of one or more cutters, D, having each a wedge-shaped shank, $d$, and shoulder $d'$, and one or more bolts, $a$, for securing said tooth or teeth to the ring, substantially as set forth.

In testimony that I claim the foregoing I have hereunto set my hand, at Milwaukee, in the county of Milwaukee and State of Wisconsin, in the presence of two witnesses.

JAMES L. PERRY.

Witnesses:
S. S. STOUT,
MAURICE F. FREAR.